US007346110B2

(12) United States Patent
Minde et al.

(10) Patent No.: US 7,346,110 B2
(45) Date of Patent: Mar. 18, 2008

(54) MULTI-CHANNEL SIGNAL ENCODING AND DECODING

(75) Inventors: Tor Björn Minde, Gammelstad (SE); Arne Steinarson, Sollentuna (SE); Anders Uvliden, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 844 days.

(21) Appl. No.: 10/380,422

(22) PCT Filed: Aug. 29, 2001

(86) PCT No.: PCT/SE01/01828

§ 371 (c)(1),
(2), (4) Date: Jun. 20, 2003

(87) PCT Pub. No.: WO02/23527

PCT Pub. Date: Mar. 21, 2002

(65) Prior Publication Data

US 2004/0044524 A1 Mar. 4, 2004

(30) Foreign Application Priority Data

Sep. 15, 2000 (SE) .................................... 0003284

(51) Int. Cl.
*H04B 1/66* (2006.01)
*G10L 19/04* (2006.01)

(52) U.S. Cl. .................. 375/240.24; 704/219; 704/220

(58) Field of Classification Search ................ 375/240, 375/295, 296, 377, 150, 148, 147, 146, 140, 375/130, 343, 340, 316, 240.24; 704/200, 704/201, 219, 220, 221, 231, 233; 379/907
See application file for complete search history.

(56) References Cited

U.S. PATENT DOCUMENTS

| | | | | |
|---|---|---|---|---|
| 5,581,652 A * | 12/1996 | Abe et al. | .................. | 704/222 |
| 5,991,717 A | 11/1999 | Minde et al. | | |
| 5,999,899 A | 12/1999 | Robinson | | |
| 6,081,781 A * | 6/2000 | Tanaka et al. | .............. | 704/268 |
| 6,104,992 A | 8/2000 | Gao et al. | | |
| 7,263,480 B2 * | 8/2007 | Minde et al. | .............. | 704/219 |

FOREIGN PATENT DOCUMENTS

| | | |
|---|---|---|
| EP | 0 684 705 | 11/1995 |
| WO | WO 90/16136 | 12/1990 |

OTHER PUBLICATIONS

Gershio, "Advances in Speech and Audio Compression", Proceedings of the IEEE, vol. 82, No. 6, Jun. 1994, pp. 900-918.

Spanias, "Speech Coding: A Tutorial Review", Proceedings of the IEEE, vol. 82, No. 10, Oct. 1994, pp. 1541-1582.

* cited by examiner

*Primary Examiner*—Temesghen Ghebretinsae
(74) *Attorney, Agent, or Firm*—Nixon & Vanderhye P.C.

(57) ABSTRACT

A multi-part fixed codebook includes both individual fixed codebooks for each channel and a shared fixed codebook. Although the shared fixed codebook is common to all channels, the channels are associated with individual lags. Furthermore, the individual fixed codebooks are associated with individual gains, and the individual lags are also associated with individual gains. The excitation from each individual fixed codebook is added to the corresponding excitation (a shared codebook vector, but individual lags and gains for each channel) from the shared fixed codebook.

17 Claims, 7 Drawing Sheets

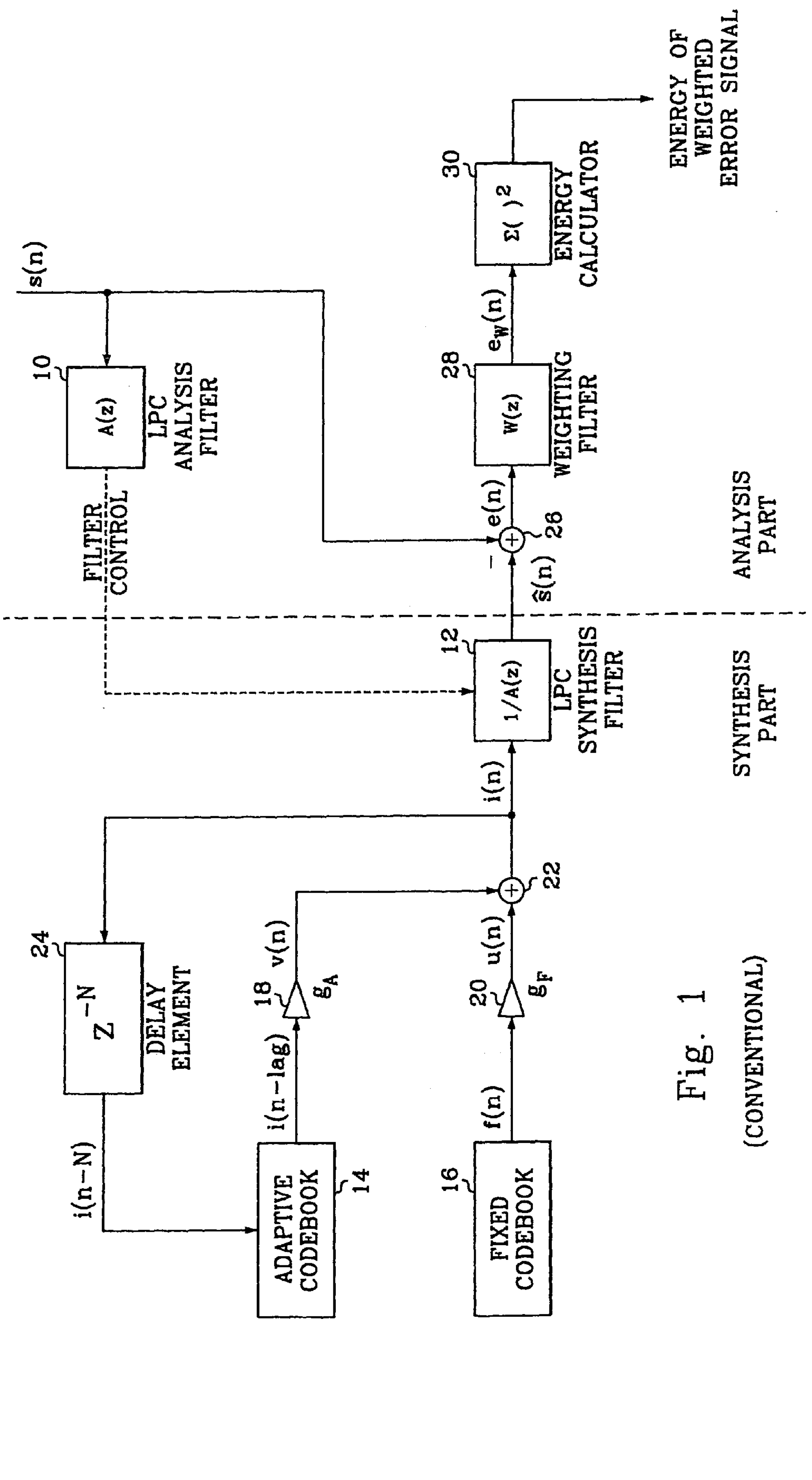
Fig. 1
(CONVENTIONAL)

MULTI-CHANNEL SIGNAL ENCODING AND DECODING

This application is the US national phase of international application PCT/SE01/01828 filed 29 Aug. 2001 which designated the U.S.

TECHNICAL FIELD

The present invention relates to encoding and decoding of multi-channel signals, such as stereo audio signals.

BACKGROUND

Conventional speech coding methods are generally based on single-channel speech signals. An example is the speech coding used in a connection between a regular telephone and a cellular telephone. Speech coding is used on the radio link to reduce bandwidth usage on the frequency limited air-interface. Well known examples of speech coding are PCM (Pulse Code Modulation), ADPCM (Adaptive Differential Pulse Code Modulation), sub-band coding, transform coding, LPC (Linear Predictive Coding) vocoding, and hybrid coding, such as CELP (Code-Excited Linear Predictive) coding [1-2].

In an environment where the audio/voice communication uses more than one input signal, for example a computer workstation with stereo loudspeakers and two microphones (stereo microphones), two audio/voice channels are required to transmit the stereo signals. Another example of a multi-channel environment would be a conference room with two, three or four channel input/output. This type of applications is expected to be used on the Internet and in third generation cellular systems.

General principles for multi-channel linear predictive analysis-by-synthesis (LPAS) signal encoding/decoding are described in [3]. However, the described principles are not always optimal in situations where there is a strong inter-channel correlation or a varying inter-channel correlation.

SUMMARY

An object of the present invention is to better exploit inter-channel correlation in multi-channel linear predictive analysis-by-synthesis signal encoding/decoding and preferably to facilitate adaptation of encoding/decoding to varying inter-channel correlation.

This object is solved in accordance with the appended claims.

Briefly, a multi-part fixed codebook is provided including an individual fixed codebook for each channel and a shared fixed codebook common to all channels. This strategy makes it possible to vary the number of bits that are allocated to the individual codebooks and the shared codebook either on a frame-by-frame basis, depending on the inter-channel correlation, or on a call-by-call basis, depending on the desired gross bitrate. Thus, in a case where the inter-channel correlation is high, essentially only the shared codebook will be required, while in a case where the inter-channel correlation is low, essentially only the individual codebooks are required. If the inter-channel correlation is known or assumed to be high, a shared fixed codebook common to all channels may suffice. Similarly, if the desired gross bitrate is low, essentially only the shared codebook will be used, while in a case where the desired gross bitrate is high, the individual codebooks may be used.

BRIEF DESCRIPTION OF THE DRAWINGS

The invention, together with further objects and advantages thereof, may best be understood by making reference to the following description taken together with the accompanying drawings, in which:

FIG. 1 is a block diagram of a conventional single-channel LPAS speech encoder;

DETAILED DESCRIPTION

Figure 2:
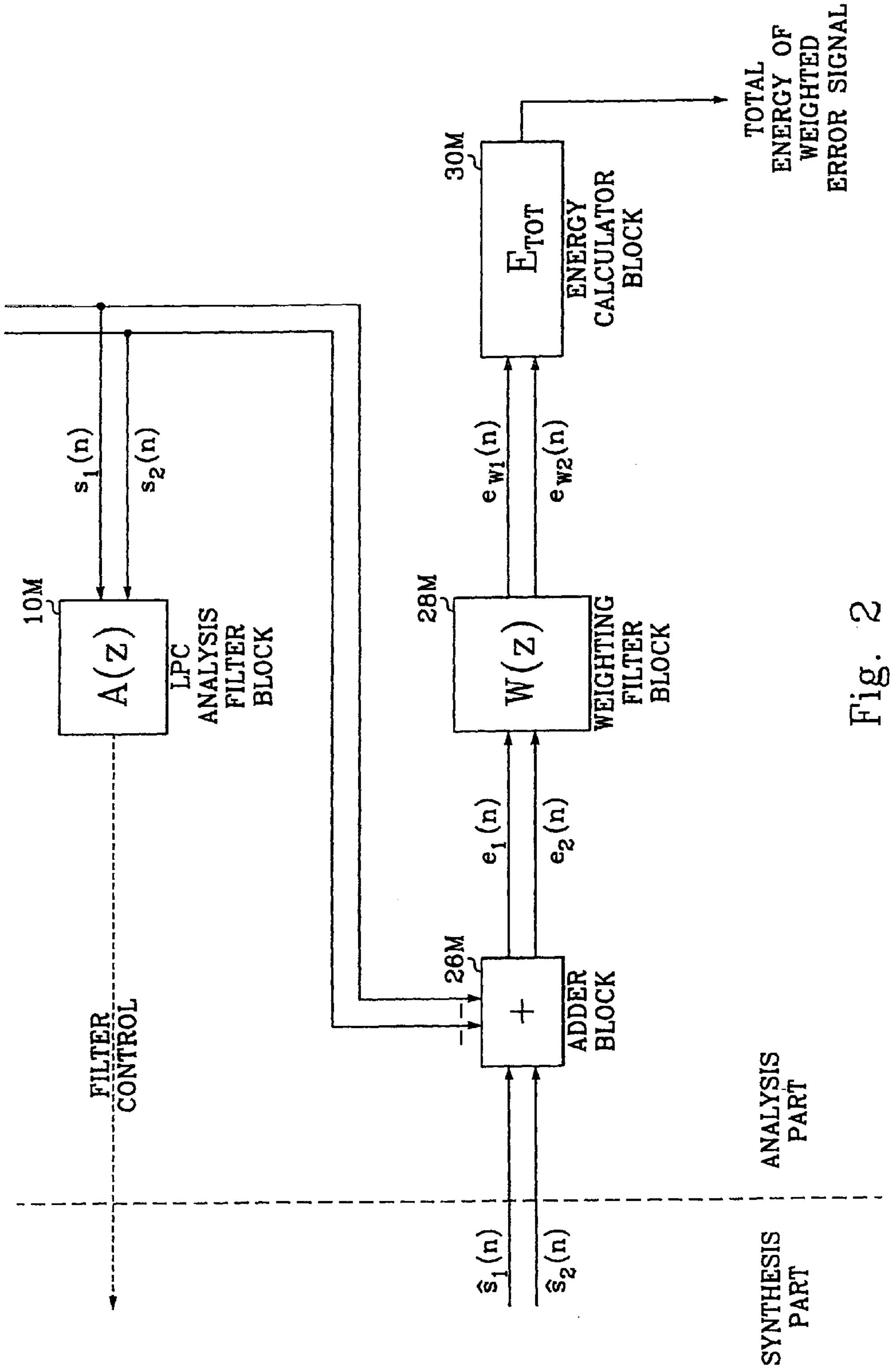
FIG. 2 is a block diagram of an embodiment of the analysis part of a prior art multi-channel LPAS speech encoder.

In the following description the same reference designations will be used for equivalent or similar elements.

The description begins by introducing a conventional single-channel linear predictive analysis-by-synthesis (LPAS) speech encoder, and a general multi-channel linear predictive analysis-by-synthesis speech encoder described in [3].

FIG. 1 is a block diagram of a conventional single-channel LPAS speech encoder. The encoder comprises two parts, namely a synthesis part and an analysis part (a corresponding decoder will contain only a synthesis part).

The synthesis part comprises a LPC synthesis filter 12, which receives an excitation signal i(n) and outputs a synthetic speech signal ŝ(n). Excitation signal i(n) is formed by adding two signals u(n) and v(n) in an adder 22. Signal u(n) is formed by scaling a signal f(n) from a fixed codebook 16 by a gain $g_F$ in a gain element 20. Signal v(n) is formed by scaling a delayed (by delay "lag") version of excitation signal i(n) from an adaptive codebook 14 by a gain $g_A$ in a gain element 18. The adaptive codebook is formed by a feedback loop including a delay element 24, which delays excitation signal i(n) one sub-frame length N. Thus, the adaptive codebook will contain past excitations i(n) that are shifted into the codebook (the oldest excitations are shifted out of the codebook and discarded). The LPC synthesis filter parameters are typically updated every 20-40 ms frame, while the adaptive codebook is updated every 5-10 ms sub-frame.

The analysis part of the LPAS encoder performs an LPC analysis of the incoming speech signal s(n) and also performs an excitation analysis.

The LPC analysis is performed by an LPC analysis filter 10. This filter receives the speech signal s(n) and builds a parametric model of this signal on a frame-by-frame basis. The model parameters are selected so as to minimize the energy of a residual vector formed by the difference between an actual speech frame vector and the corresponding signal vector produced by the model. The model parameters are represented by the filter coefficients of analysis filter 10. These filter coefficients define the transfer function A(z) of the filter. Since the synthesis filter 12 has a transfer function that is at least approximately equal to 1/A(z), these filter coefficients will also control synthesis filter 12, as indicated by the dashed control line.

The excitation analysis is performed to determine the best combination of fixed codebook vector (codebook index), gain $g_F$, adaptive codebook vector (lag) and gain $g_A$ that results in the synthetic signal vector $\{\hat{s}(n)\}$ that best matches speech signal vector $\{s(n)\}$ (here { } denotes a collection of samples forming a vector or frame). This is done in an exhaustive search that tests all possible combinations of these parameters (sub-optimal search schemes, in which some parameters are determined independently of the other parameters and then kept fixed during the search for the remaining parameters, are also possible). In order to test how close a synthetic vector $\{\hat{s}(n)\}$ is to the corresponding speech vector $\{s(n)\}$, the energy of the difference vector $\{e(n)\}$ (formed in an adder 26) may be calculated in an energy calculator 30. However, it is more efficient to consider the energy of a weighted error signal vector $\{(e_W(n)\}$, in which the errors has been re-distributed in such a way that large errors are masked by large amplitude frequency bands. This is done in weighting filter 28.

The modification of the single-channel LPAS encoder of FIG. 1 to a multi-channel LPAS encoder in accordance with [3] will now be described with reference to FIG. 2-3. A two-channel (stereo) speech signal will be assumed, but the same principles may also be used for more than two channels.

FIG. 2 is a block diagram of an embodiment of the analysis part of the multi-channel LPAS speech encoder described in [3]. In FIG. 2 the input signal is now a multi-channel signal, as indicated by signal components $s_1(n)$, $s_2(n)$. The LPC analysis filter 10 in FIG. 1 has been replaced by a LPC analysis filter block 10M having a matrix-valued transfer function A(z). Similarly, adder 26, weighting filter 28 and energy calculator 30 are replaced by corresponding multi-channel blocks 26M, 28M and 30M, respectively.

Figure 3:
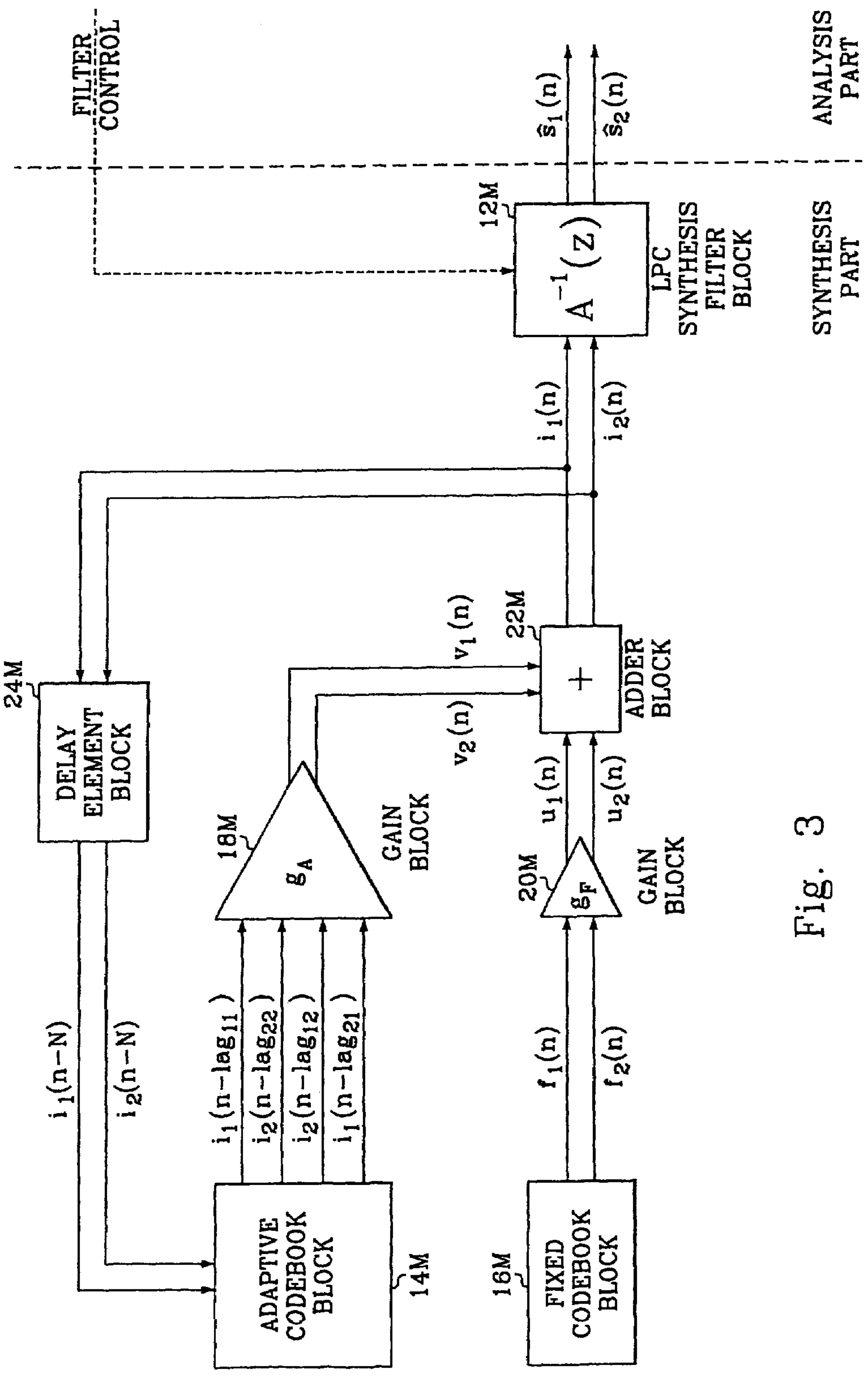
FIG. 3 is a block diagram of an embodiment of the synthesis part of a prior art multi-channel LPAS speech encoder.

FIG. 3 is a block diagram of an embodiment of the synthesis part of the multi-channel LPAS speech encoder described in [3]. A multi-channel decoder may also be formed by such a synthesis part. Here LPC synthesis filter 12 in FIG. 1 has been replaced by a LPC synthesis filter block 12M having a matrix-valued transfer function $A^{-1}(z)$, which is (as indicated by the notation) at least approximately equal to the inverse of A(z). Similarly, adder 22, fixed codebook 16, gain element 20, delay element 24, adaptive codebook 14 and gain element 18 are replaced by corresponding multi-channel blocks 22M, 16M, 24M, 14M and 18M, respectively.

A problem with this prior art multi-channel encoder is that it is not very flexible with regard to varying inter-channel correlation due to varying microphone environments. For example, in some situations several microphones may pick up speech from a single speaker. In such a case the signals from the different microphones are essentially delayed and scaled versions (assuming echoes may be neglected) of the same signal, i.e. the channels are strongly correlated. In other situations there may be different simultaneous speakers at the individual microphones. In this case there is almost no inter-channel correlation.

Figure 4:
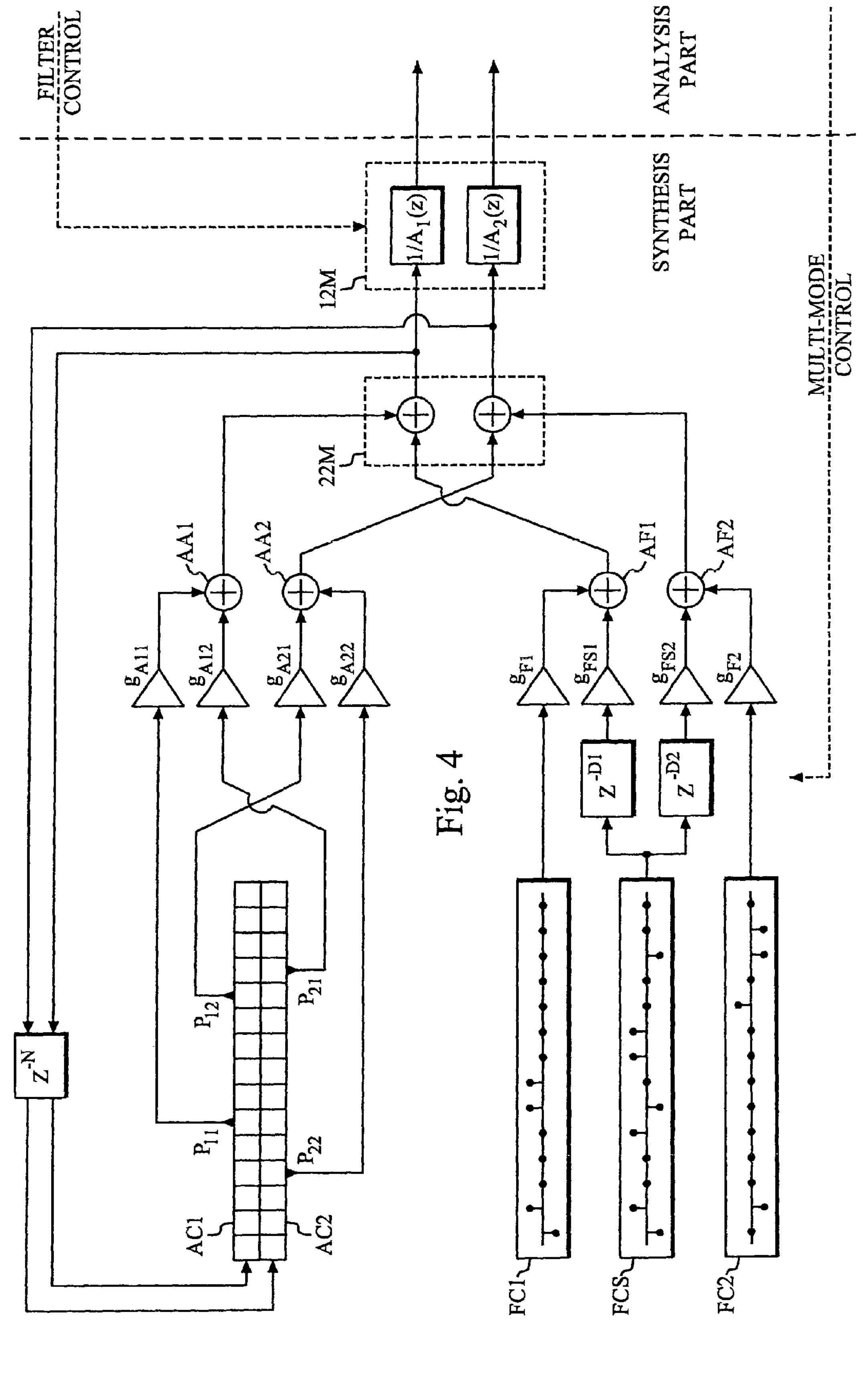
FIG. 4 is a block diagram of an exemplary embodiment of the synthesis part of a multi-channel LPAS speech encoder in accordance with the present invention.

FIG. 4 is a block diagram of an example embodiment of the synthesis part of a multi-channel LPAS speech encoder. The multi-part fixed codebook includes both individual fixed codebooks FC1, FC2 for each channel and a shared fixed codebook FCS. Although the shared fixed codebook FCS is common to all channels (which means that the same codebook index is used by all channels), the channels are associated with individual lags D1, D2, as illustrated in FIG. 4. Furthermore, the individual fixed codebooks FC1, FC2 are associated with individual gains $g_{F1}$, $g_{F2}$, while the individual lags D1, D2 (which may be either integer or fractional) are associated with individual gains $g_{FS1}$, $g_{FS2}$. The excitation from each individual fixed codebook FS1, FS2 is added to the corresponding excitation (a common codebook vector, but individual lags and gains for each channel) from the shared fixed codebook FCS in an adder AF1, AF2. Typically the fixed codebooks comprise algebraic codebooks, in which the excitation vectors are formed by unit pulses that are distributed over each vector in accordance with certain rules (this is well known in the art and will not be described in further detail here).

This multi-part fixed codebook structure is very flexible. For example, some coders may use more bits in the individual fixed codebooks, while other coders may use more bits in the shared fixed codebook. Furthermore, a coder may dynamically change the distribution of bits between individual and shared codebooks, depending on the inter-channel correlation. For some signals it may even be appropriate to allocate more bits to one individual channel than to the other channels (asymmetric distribution of bits).

Although FIG. 4 illustrates a two-channel fixed codebook structure, it is appreciated that the concepts are easily generalized to more channels by increasing the number of individual codebooks and the number of lags and inter-channel gains.

The shared and individual fixed codebooks are typically searched in serial order. The preferred order is to first determine the shared fixed codebook excitation vector, lags and gains. Thereafter the individual fixed codebook vectors and gains are determined.

Two multi-part fixed codebook search methods will now be described with reference to FIGS. 5 and 6.

Figure 5:
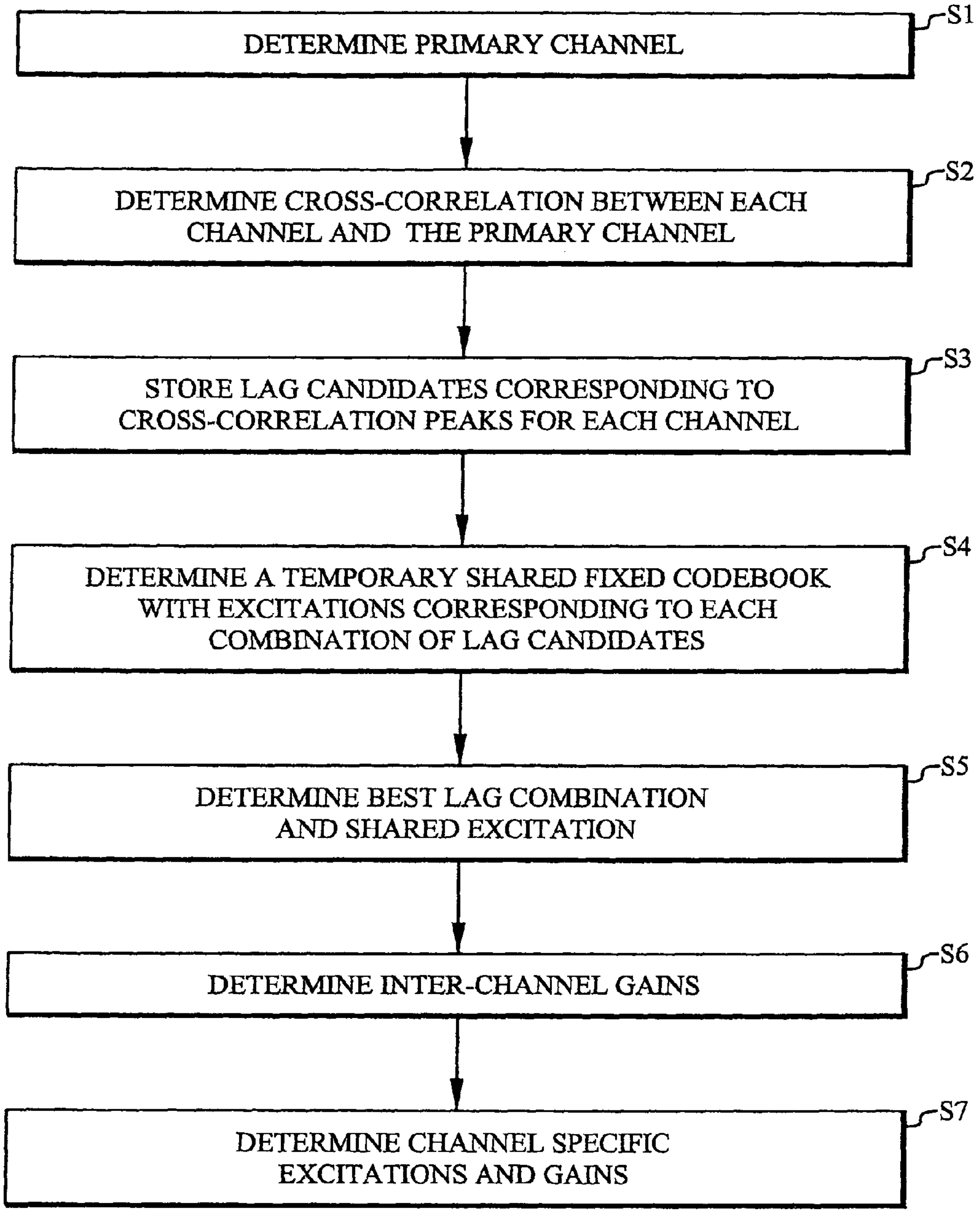
FIG. 5 is a flow chart of an exemplary embodiment of a multi-part fixed codebook search method in accordance with the present invention.

FIG. 5 is a flow chart of an example embodiment of a multi-part fixed codebook search method. Step S1 determines a primary or leading channel, typically the strongest channel (the channel that has the largest frame energy). Step S2 determines the cross-correlation between each secondary or lagging channel and the primary channel for a predetermined interval, for example a part of or a complete frame. Step S3 stores lag candidates for each secondary channel. These lag candidates are defined by the positions of a number of the highest cross-correlation peaks and the closest positions around each peak for each secondary channel. One could for instance choose the 3 highest peaks, and then add the closest positions on both sides of each peak, giving a total of 9 lag candidates. If high-resolution (fractional) lags are used the number of candidates around each peak may be increased to, for example, 5 or 7. The higher resolution may be obtained by up-sampling of the input signal. The lag for the primary channel may in a simple embodiment be considered to be zero. However, since the pulses in the codebook typically can not have arbitrary positions, a certain coding gain may be achieved by assigning a lag also to the primary channel. This is especially the case when high-resolution lags are used. In step S4 a temporary shared fixed codebook vector is formed for each stored lag candidate combination. Step S5 selects the lag combination that corresponds to the best temporary codebook vector. Step S6 determines the optimum inter-channel gains. Finally step S7 determines the channel specific (non-shared) excitations and gains.

In a variation of this algorithm all of or the best temporary codebook vectors and corresponding lags and inter-channel gains are retained. For each retained combination a channel specific search in accordance with step S7 is performed. Finally, the best combination of shared and individual fixed codebook excitation is selected.

In order to reduce the complexity of this method, it is possible to restrict the excitation vector of the temporary codebook to only a few pulses. For example, in the GSM system the complete fixed codebook of an enhanced full rate channel includes 10 pulses. In this case 3-5 temporary codebook pulses is reasonable. In general 25-50% of the total number of pulses would be a reasonable number. When the best lag combination has been selected, the complete codebook is searched only for this combination (typically the already positioned pulses are unchanged, only the remaining pulses of a complete codebook have to be positioned).

Figure 6:
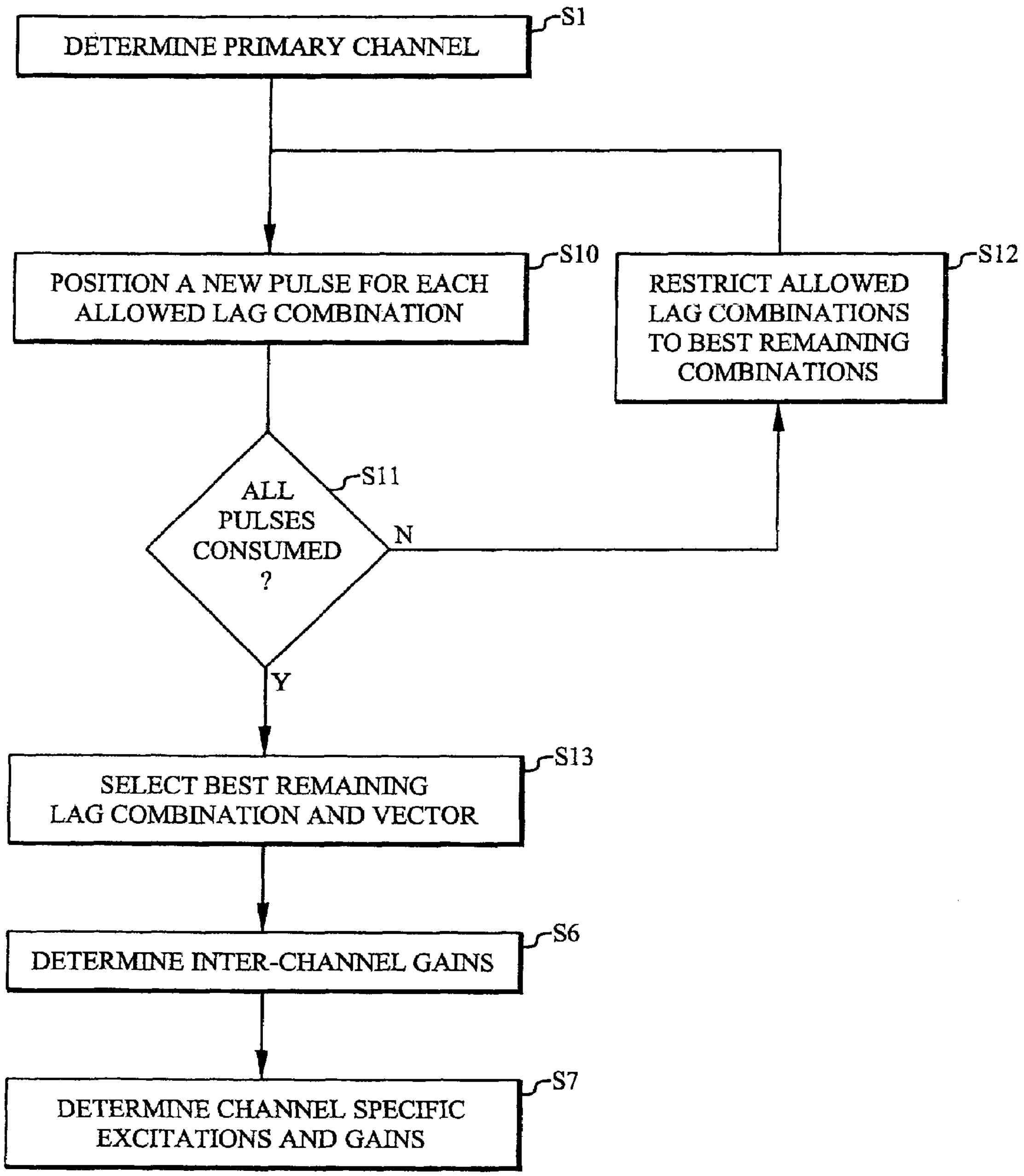
FIG. 6 is a flow chart of another exemplary embodiment of a multi-part fixed codebook search method in accordance with the present invention.

FIG. 6 is a flow chart of another example embodiment of a multi-part fixed codebook search method. In this embodiment steps S1, S6 and S7 are the same as in the embodiment of FIG. 5. Step S10 positions a new excitation vector pulse in an optimum position for each allowed lag combination (the first time this step is performed all lag combinations are allowed). Step S11 tests whether all pulses have been consumed. If not, step S12 restricts the allowed lag combinations to the best remaining combinations. Thereafter another pulse is added to the remaining allowed combinations. Finally, when all pulses have been consumed, step S13 selects the best remaining lag combination and its corresponding shared fixed codebook vector.

There are several possibilities with regard to step S12. One possibility is to retain only a certain percentage, for example 25%, of the best lag combinations in each iteration. However, in order to avoid that there only remains one combination before all pulses have been consumed, it is possible to ensure that at least a certain number of combinations remain after each iteration. One possibility is to make sure that there always remain at least as many combinations as there are pulses left plus one. In this way there will always be several candidate combinations to choose from in each iteration.

For the fixed codebook gains, each channel requires one gain for the shared fixed codebook and one gain for the individual codebook. These gains will typically have significant correlation between the channels. They will also be correlated to gains in the adaptive codebook. Thus, inter-channel predictions of these gains will be possible, and vector quantization may be used to encode them.

Returning to FIG. 4, the adaptive codebook includes one adaptive codebook AC1, AC2 for each channel. An adaptive codebook can be configured in a number of ways in a multi-channel coder.

One possibility is to let all channels share a common pitch lag. This is feasible when there is a strong inter-channel correlation. Even when the pitch lag is shared, the channels may still have separate pitch gains $g_{A11}$-$g_{A22}$. The shared pitch lag is searched in a closed loop fashion in all channels simultaneously.

Another possibility is to let each channel have an individual pitch lag. This is feasible when there is a weak inter-channel correlation (the channels are in-dependent). The pitch lags may be coded differentially or absolutely.

A further possibility is to use the excitation history in a cross-channel manner. For example, channel 2 may be predicted from the excitation history of channel 1 at inter-channel lag $P_{12}$. This is feasible when there is a strong inter-channel correlation.

As in the case with the fixed codebook, the described adaptive codebook structure is very flexible and suitable for multi-mode operation. The choice whether to use shared or individual pitch lags may be based on the residual signal energy. In a first step the residual energy of the optimal shared pitch lag is determined. In a second step the residual energy of the optimal individual pitch lags is determined. If the residual energy of the shared pitch lag case exceeds the residual energy of the individual pitch lag case by a predetermined amount, individual pitch lags are used. Otherwise a shared pitch lag is used. If desired, a moving average of the energy difference may be used to smoothen the decision.

This strategy may be considered as a "closed-loop" strategy to decide between shared or individual pitch lags. Another possibility is an "open-loop" strategy based on, for example, inter-channel correlation. In this case, a shared pitch lag is used if the inter-channel correlation exceeds a predetermined threshold. Otherwise individual pitch lags are used.

Similar strategies may be used to decide whether to use inter-channel pitch lags or not.

Furthermore, a significant correlation is to be expected between the adaptive codebook gains of different channels. These gains may be predicted from the internal gain history of the channel, from gains in the same frame but belonging to other channels, and also from fixed codebook gains. As in the case with the fixed codebook, vector quantization is also possible.

In LPC synthesis filter block 12M in FIG. 4 each channel uses an individual LPC (Linear Predictive Coding) filter. These filters may be derived independently in the same way as in the single channel case. However, some or all of the channels may also share the same LPC filter. This allows for switching between multiple and single filter modes depending on signal properties, e.g. spectral distances between LPC spectra.

Figure 7:
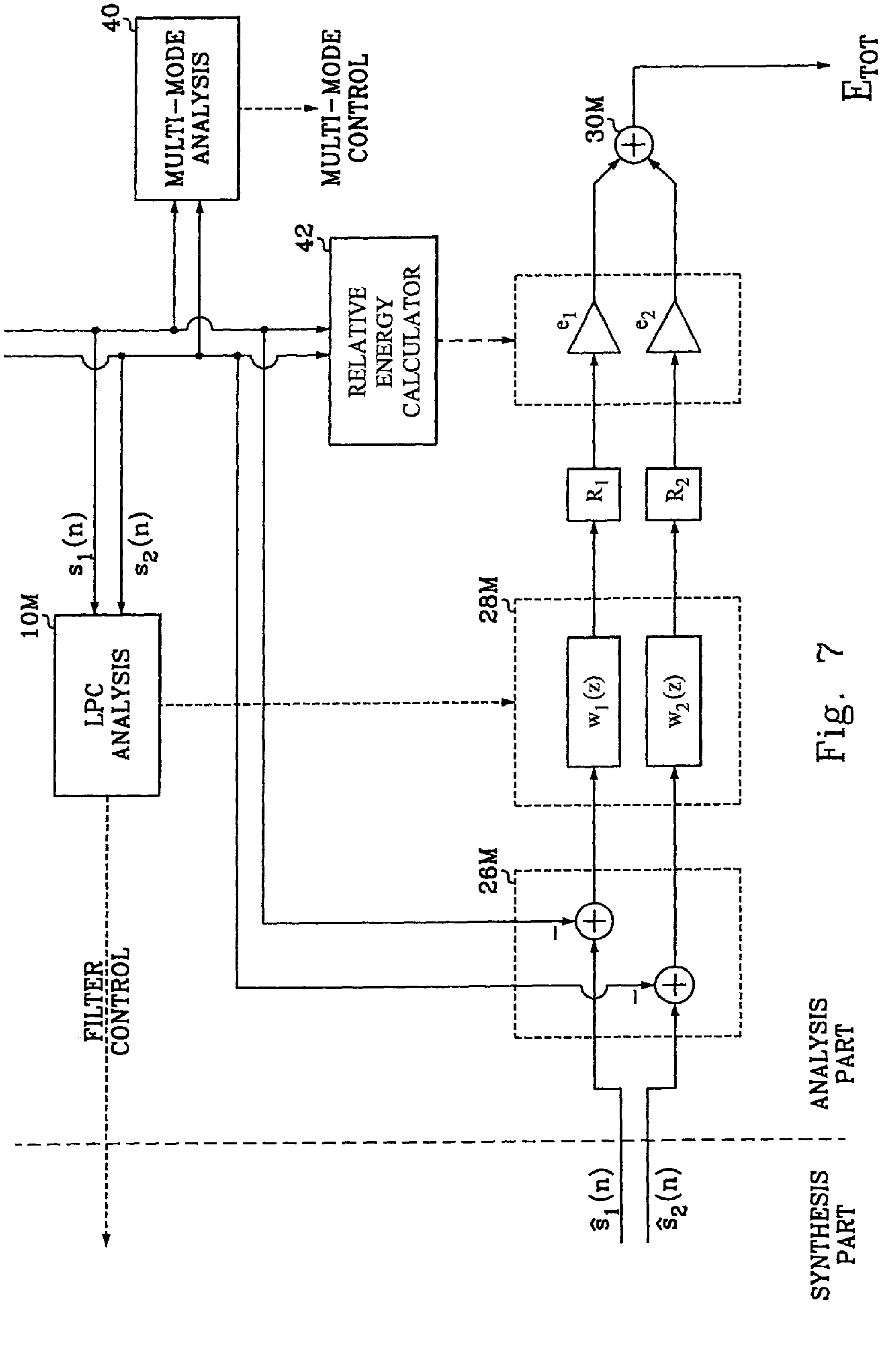
FIG. 7 is a block diagram of an exemplary embodiment of the analysis part of a multi-channel LPAS speech encoder in accordance with the present invention.

FIG. 7 is a block diagram of an example embodiment of the analysis part of a multi-channel LPAS speech encoder. In addition to the blocks that have already been described with reference to FIG. 1 and 2, the analysis part in FIG. 7 includes a multi-mode analysis block 40. Block 40 determines the inter-channel correlation to determine whether there is enough correlation between the channels to justify encoding using only the shared fixed codebook FCS, lags D1, D2 and gains $g_{FS1}$, $g_{FS2}$. If not, it will be necessary to use the individual fixed codebooks FC1, FC2 and gains $g_{F1}$, $g_{F2}$. The correlation may be determined by the usual correlation in the time domain, i.e. by shifting the secondary channel signals with respect to the primary signal until a best fit is obtained. If there are more than two channels, a shared fixed codebook will be used if the smallest correlation value exceeds a predetermined threshold. Another possibility is to use a shared fixed codebook for the channels that have a correlation to the primary channel that exceeds a predetermined threshold and individual fixed codebooks for the remaining channels. The exact threshold may be determined by listening tests.

In a low bit-rate coder the fixed codebook may include only a shared codebook FCS and corresponding lag elements D1, D2 and inter-channel gains $g_{FS1}$, $g_{FS2}$ This embodiment is equivalent to an inter-channel correlation threshold equal to zero.

The analysis part may also include a relative energy calculator 42 that determines scale factors $e_1$, $e_2$ for each channel. These scale factors may be determined in accordance with:

$$e_i = \frac{E_i}{\sum_i E_i}$$

where $E_i$ is the energy of frame i. Using these scale factors, the weighted residual energy $R_1$, $R_2$ for each channel may be rescaled in accordance with the relative strength of the channel, as indicated in FIG. 7. Rescaling the residual energy for each channel has the effect of optimizing for the relative error in each channel rather than optimizing for the absolute error in each channel. Multi-channel error resealing may be used in all steps (deriving LPC filters, adaptive and fixed codebooks).

The scale factors may also be more general functions of the relative channel strength $e_i$, for example $$f(e_i) = \frac{\exp(\alpha(2e_i - 1))}{1 + \exp(\alpha(2e_i - 1))}$$

where $\alpha$ is a constant in he interval 4-7, for example $\alpha \approx 5$. The exact form of the scaling function may be determined by subjective listening tests.

The functionality of the various elements of the described embodiments of the present invention are typically implemented by one or several micro processors or micro/signal processor combinations and corresponding software.

The description above has been primarily directed towards an encoder. The corresponding decoder would only include the synthesis part of such an encoder. Typically and encoder/decoder combination is used in a terminal that transmits/receives coded signals over a bandwidth limited communication channel. The terminal may be a radio terminal in a cellular phone or base station. Such a terminal would also include various other elements, such as an antenna, amplifier, equalizer, channel encoder/decoder, etc. However, these elements are not essential for the description and have therefor been omitted.

It will be understood by those skilled in the art that various modifications and changes may be made. The present invention is defined by the appended claims.

REFERENCES

[1] A. Gersho, "Advances in Speech and Audio Compression", Proc. of the IEEE, Vol. 82, No. 6, pp 900-918, June 1994,

[2] A. S. Spanias, "Speech Coding: A Tutorial Review", Proc. of the IEEE, Vol 82, No. 10, pp 1541-1582, October 1994.

[3] WO 00/19413 (Telefonaktiebolaget LM Ericsson).

The invention claimed is:

1. A multi-channel linear predictive analysis-by-synthesis signal encoder including a multi-part fixed codebook, comprising:

an individual fixed codebook for each channel;

a shared fixed codebook containing code book vectors that are common to all channels; and electronic circuitry configured to analyze inter-channel correlation for dynamic bit allocation between said individual fixed codebooks and said shared fixed codebook, wherein said shared fixed codebook is connected to an individual delay element (D1, D2) for each channel.

2. The encoder of claim 1, wherein said individual delay elements are high-resolution elements.

3. The encoder of claim 1, wherein each delay element is connected to a corresponding gain element.

4. The encoder of claim 1, wherein the encoder is configured for use in a transmitter to encode a signal before transmission by the transmitter.

5. A multi-channel linear predictive analysis-by-synthesis signal encoder including a multi-part fixed codebook, comprising:

an individual fixed codebook for each channel;

a shared fixed codebook containing code book vectors that are common to all channels;

electronic circuitry configured to analyze inter-channel correlation for dynamic bit allocation between said individual fixed codebooks and said shared fixed codebook; and a multi-part adaptive codebook having an individual adaptive codebook and an individual pitch lag for each channel.

6. The encoder of claim 5, further comprising electronic circuitry configured to determine whether a common pitch lag can be shared by all channels.

7. The encoder of claim 5, characterized by inter-channel pitch lags between each channel and the other channels.

8. A multi-channel linear predictive analysis-by-synthesis signal encoder including a multi-part fixed codebook, comprising:

an individual fixed codebook for each channel;

a shared fixed codebook containing code book vectors that are common to all channels; and electronic circuitry configured to analyze inter-channel correlation for dynamic bit allocation between said individual fixed codebooks and said shared fixed codebook and to rescale the residual energy of each channel in accordance with the relative channel strength.

9. A communications terminal including a multi-channel linear predictive analysis-by-synthesis speech encoder/decoder having a multi-part fixed codebook, comprising:

an individual fixed codebook for each channel;

a shared fixed codebook containing code book vectors that are common to all channels; and means for analyzing inter-channel correlation for dynamic bit allocation between said individual fixed codebooks and said shared fixed codebook, wherein said shared fixed codebook is connected to an individual delay element for each channel.

10. The terminal of claim 9, wherein said individual delay elements are high-resolution elements.

11. The terminal of claim 9, wherein each delay element is connected to a corresponding gain element.

12. The terminal of claim 9, wherein said terminal is a radio terminal.

13. A communications terminal including a multi-channel linear predictive analysis-by-synthesis speech encoder/decoder having a multi-part fixed codebook, comprising:

an individual fixed codebook for each channel;

a shared fixed codebook containing code book vectors that are common to all channels; and means (40) for analyzing inter-channel correlation for dynamic bit allocation between said individual fixed codebooks and said shared fixed codebook, a multi-part adaptive codebook having an individual adaptive codebook and an individual pitch lag for each channel.

14. The terminal of claim 13, further comprising means for determining whether a common pitch lag can be shared by all channels.

15. The terminal of claim 13, characterized by inter-channel pitch lags between each channel and the other channels.

16. A multi-channel linear predictive analysis-by-synthesis signal encoding method for use in encoding a communications signal, comprising:

determining a desired gross bit rate;

analyzing inter-channel correlation; and dynamically changing, depending on the current inter-channel correlation and said desired gross bit rate, encoding bit allocation between fixed codebooks dedicated to individual channels and a shared fixed codebook containing code book vectors that are common to all channels.

17. The method in claim 16, wherein the method is used to encode a signal before transmitting the signal.

* * * * *

UNITED STATES PATENT AND TRADEMARK OFFICE

CERTIFICATE OF CORRECTION

PATENT NO. : 7,346,110 B2
APPLICATION NO. : 10/380422
DATED : March 18, 2008
INVENTOR(S) : Minde et al.

It is certified that error appears in the above-identified patent and that said Letters Patent is hereby corrected as shown below:

In the Specifications:

In Column 3, Line 22, delete "$\{(e_w(n)\},$" and insert -- $\{e_w(n)\},$ --, therefor.

In Column 7, Line 18, delete "resealing" and insert -- rescaling --, therefor.

Signed and Sealed this
Third Day of September, 2013

Teresa Stanek Rea
*Acting Director of the United States Patent and Trademark Office*